Patented Sept. 1, 1925.

1,552,122

UNITED STATES PATENT OFFICE.

ANTONIUS DE GRAAFF, OF EINDHOVEN, NETHERLANDS, ASSIGNOR TO GENERAL ELECTRIC COMPANY, A CORPORATION OF NEW YORK.

MANUFACTURE OF TUNGSTEN POWDER.

No Drawing.   Application filed July 20, 1922.   Serial No. 576,388.

*To all whom it may concern:*

Be it known that I, ANTONIUS DE GRAAFF, a subject of the Queen of the Netherlands, residing at Eindhoven, in the Province of North Brabant, in the Kingdom of the Netherlands, have invented certain new and useful Improvements in or Relating to the Manufacture of Tungsten Powder, of which the following is a specification.

This invention relates to a method of producing tungsten powder.

One method for the manufacture of this powder starts from pure tungstic acid which is prepared by decomposing a pure tungstate with an acid. This tungstic acid is then subjected to a treatment at high temperature in fire-resisting crucibles and is then reduced. The powder which results therefrom may be subjected to several mechanical treatments such as pressing, hammering and drawing. The resulting wire is ready to be mounted in lamps.

Wire thus manufactured shows however several defects; particularly after operation of incandescence the wire is very brittle, probably due to unequal crystallization. Owing to this decreased mechanical strength, the wire is much less proof against shocks such as occur when switching on the current, and therefore the life of the lamp is apt to be shortened. In order to avoid these defects, several methods have been proposed as for instance the addition of silica, $SiO_2$ (British Patent No. 155851) or of thoria, $ThO_2$ (United States Patent No. 1201611) to the tungsten material.

With the present invention much better results can be obtained according to which instead of starting from a simple tungstic acid, a complex tungstic acid is used, for example a compound containing tungsten and a metalloid, such as silico-tungstic acid, boro-tungstic acid or the like, or suitable salts thereof.

There are several methods by which tungsten powder may be prepared from these compounds and some are indicated more fully hereinafter but only by way of example.

Deviations from these methods are possible without departing from the scope of this invention.

Example 1.

600 grams of sodium tungstate are dissolved in 4000 c. c. water and neutralized with strong hydrochloric acid to which solution 48 grams water glass and 100 c. c. acetic acid 98% are added and boiled, until strong hydrochloric acid no longer precipitates tungstic acid. After cooling, strong hydrochloric acid is added while stirring. The solution is then cooled again and subsequently boiled and saturated with æther, after which 50 gr. of sodium fluoride is dissolved in the solution. Three layers are now formed, viz, an upper-layer of æther, then a solution of the sodium salts and then an oily layer, which contains the silico-tungstic acid.

The oily-layer, which is formed after about twelve hours is removed with the aid of a siphon and shaken with double the volume of water in a separating funnel, after which again three layers are formed. The intermediate layer is removed and crystallized while being stirred or agitated in any other way.

The light-yellow crystals obtained are first heated for 6 hours to 150° C. and then for 3 hours to 250° C. Then they are powdered and heated during an hour to 1360° C. Finally the powder is reduced with hydrogen.

Example 2.

1200 grams ammonium tungstate are boiled with 600 grams gelatinous silicic acid in 8 liters of water, until strong hydrochloric acid does not precipitate any more tungstic acid. Then the excess of silicic acid is filtered off and the filtrate dried by vaporization.

The white crystalline mass is then heated during 12 hours to 150° C., then coarsely powdered and heated during 3 hours to 450° C. The light-yellow product is then pulverized, sifted and reduced in a hydrogen stream.

Example 3.

9000 grams technical tungstic acid are dissolved in 17 liters of ammonia (7 liters strong ammonia and 10 liters water) and filtered. The filtrate is boiled with 3000 grams gelatinous silicic acid until hydrochloric acid no longer precipitates tungstic acid in a small sample. The liquid is evaporated unitl crystallization begins, after which the solution is poured into 1 liter of strong hydrochloric acid while stirring. The white crystals obtained are dried by suction and heated to 100° C., powdered and reduced.

The methods described in examples 2 and 3 have the advantage that the silico tungstate can be reduced at once, so that it is unnecessary as hitherto to decompose the tungsten salts with an acid to obtain pure tungstic acid.

Example 4.

1000 grams sodium tungstate and 150 grams boric acid are boiled in about 4 liters of water until strong hydrochloric acid no longer precipitates tungstic acid in a small sample.

After cooling, the crystals are dried by suction and the filtrate is boiled again with 700 grams boric acid and strongly heated by vaporization. After again cooling the crystal mass is dried by suction and the filtrate is saturated with æther. Then an equal volume of strong hydrochloric acid is added and the oil layer is siphoned off. With an equal volume of water the boro-tungstic acid is separated out and the æther is driven off by an air stream.

The liquid is vaporized until crystallization begins; the crystals are heated to 150° C. and the tungsten powder obtained reduced with hydrogen.

The tungsten powder obtained in any of these methods can, if desired, be treated with hydrofluoric acid in order to drive out any excess of silica $SiO_2$.

The powder thus obtained is pressed to bars and after heating and preparing is drawn to wire. During the sintering process, oxides contained in the material are vaporized.

The bar of tungsten obtained in the aforesaid manner is characterized by a very fine structure. From 5000 to 10000 particles per sq. mm. have been found. The wire manufactured therefrom was characterized by an equal crystal structure and great pliability whereas the resistance to mechanical influences was materially higher than with wires manufactured according to old methods.

A wire was tested on a special apparatus resisted 250 shocks whereas the wire usually used only withstood one hundred shocks.

A lamp provided with a filament according to the invention, showed a duration of life three times as great as ordinary lamps burning with the same number of watts per candle power.

It is possible that the molecularly divided silicic acid or boric acid causes these exceedingly good qualities, because it may prevent during the preparation the adhesion of the tungsten particles and consequently the inclusion of impurities. It is also possible that the physical properties of the tungsten so obtained cause the improvement in quality. These are however theoretical suppositions which do not affect the invention.

Further it is to be observed that tungsten powder obtained by the invention can be used for purposes other than for the manufacture of drawn wire for electric lamps.

I mean by the appended claims to cover not only the preparation of tungsten from silico-tungstic acid but also as an equivalent the preparation of tungsten from boro-tungstic acid.

What I claim is:

1. The process of preparing metallic tungsten powder for the manufacture of filaments and like bodies which consists in forming silico-tungstic acid, removing by-products of the reaction whereby said compound is formed, pulverizing said compound and reducing said compound with hydrogen to form metallic tungsten containing silica.

2. The process of preparing metallic tungsten powder for the manufacture of filaments and like bodies which consists in treating a tungstate of an alkali metal with a silicon compound capable of forming silico-tungstic acid, extracting said acid, crystallizing therefrom silico-tungstic acid, heating said acid at about 100° C., powdering and finally reducing with hydrogen.

3. The process of preparing tungsten metal which consists in heating an aqueous solution of ammonium tungstate with gelatinous silicic acid, removing the resulting silico-tungstic acid, drying the same, powdering the same and reducing with hydrogen.

In testimony whereof I affix my signature.

ANTONIUS DE GRAAFF.